United States Patent [19]

Barnes

[11] Patent Number: 5,082,827

[45] Date of Patent: Jan. 21, 1992

[54] RECORDING HEAD SUSPENSION UTILIZING SUPERCONDUCTOR MEANS

[75] Inventor: Frank S. Barnes, Boulder, Colo.

[73] Assignee: University of Colorado Foundation, Inc., Boulder, Colo.

[21] Appl. No.: 532,302

[22] Filed: Jun. 1, 1990

[51] Int. Cl.⁵ .................... H01B 12/00; G11B 21/02; G11B 21/22; G11B 5/54

[52] U.S. Cl. ........................................ 505/1; 360/75; 360/105

[58] Field of Search .................. 360/75, 103, 105, 109; 505/700, 701, 705, 831, 832, 833, 834, 838–840

[56] References Cited

U.S. PATENT DOCUMENTS 4,814,907  3/1989  Goor ..................................... 360/75
4,843,504  6/1989  Barnes .

FOREIGN PATENT DOCUMENTS 1-17276  1/1989  Japan .

Primary Examiner—A. J. Heinz
Attorney, Agent, or Firm—Earl C. Hancock; Francis A. Sirr

[57] ABSTRACT

In a disk file data storage device wherein a radially movable recording head operates to write/read data relative to a recording disk, an electrically energizable superconductor magnetic suspension system is provided for supporting the head in close flying proximity to the surface to the disk's flat recording surface. The head is force biased away from the recording surface by operation of a spring force. The magnetic suspension system includes a superconducting member and a coil member. The superconducting member and coil member that are mounted in confronting relation, such that electrical energization of the coil member produces a magnetic mirror or Meissner force in opposition to the spring force. Variable energization of the coil member operates to support the head at a controlled flying distance from the recording surface. A stack of disks having a plurality head means and a plurality of superconductor/coil pairs, one pair associated with each recording surface, is disclosed. Operation of the storage device within an evacuated housing is described.

11 Claims, 3 Drawing Sheets

RECORDING HEAD SUSPENSION UTILIZING SUPERCONDUCTOR MEANS

FIELD OF THE INVENTION

This invention relates to the field of data storage by means of the transducing cooperation that exists between a movable read/write head or transducer means and moving recording medium, such as a magnetic or an optical disk or tape. More specifically, the invention relates to a controllable superconductor magnetic suspension system for supporting a recording head in close flying proximity to a recording disk by virtue of the Meissner or magnetic mirror effect.

BACKGROUND OF THE INVENTION

In the art of magnetic and optical data storage or recording, it is known to provide one or more flat, circular, recording disks that are supported on a motor driven spindle, for rotation at a generally constant velocity about the spindle's center of rotation. When more than one disk is mounted on the spindle, the assembly is called a disk stack or disk pack. It is conventional practice to provide a comb-like head access arm assembly that moves generally radially of the disk stack. Each arm of this assembly (other that the two arms at the extreme ends of the arm assembly) carries two transducing heads. Each of these two heads is positioned to cooperate with the two closely spaced and confronting recording surfaces of the two adjacent disks.

In order to provide efficient packaging of the disk stack, it is desirable that the disks of the stack be closely spaced, thus requiring that the head support arms that penetrate the space between adjacent disks be of a small or thin profile relative to the axial direction of the disk supporting spindle.

High density recording of this type requires that the recording heads be closely spaced relative to the surface of the recording disk. The term "flying head" has been used to describe this positional relationship of only a few microns. This close head to disk spacing must be maintained without head crashes occurring. Usually, this close head flying relationship is provided by the air film that is developed by the rapidly rotating disk, and by the aerodynamic profile of a slider on which the head is mounted.

In disk drives that make use of the superconducting phenomenon, and preferably operate in a substantial vacuum, this air bearing, flying head environment is difficult to achieve. One advantage of the present invention is that this problem is solved.

The present invention makes use of the well known Meissner or magnetic mirror effect, i.e. the property of a superconducting material whereby the material generally blocks the passage of a magnetic flux field through the material. In the case of mixed state superconducting material, small magnetic vortices may thread the surface of the superconducting material. In either case, as a result of the Meissner effect, magnetic flux is bent or guided away from the superconducting material. As a result, a repulsion force is developed between a magnetic field source and the superconducting material.

The present invention provides an electrically energizable coil as a source of a variable magnitude magnetic field. In this way a controllable Meissner or magnetic mirror force is provided. This coil and a superconducting material are associated in a manner to provide a controlled transducing height between a transducing head and the surface of a closely adjacent data recording disk, the magnitude of this flying height being a function of the magnitude of coil energization.

Commonly assigned U.S. Pat. No. 4,843,504, incorporated herein by reference, is of interest in that it discloses and claims superconductive devices useful in disk drives, and more specifically a drive mechanism for positioning a transducing head relative to circular recording media. This head is attached to an arm, and the arm is bearing supported by way of a superconductor layer that cooperates with a magnet in accordance with the Meissner effect. In this way, the arm's bearing assembly, which includes the superconducting layer and the magnet in interfacing relation, operates to support the arm throughout its radial travel relative to the disk.

Commonly assigned patent application Ser. No. 07/336,995, filed Apr. 12, 1989, is a divisional application of above mentioned U.S. Pat. No. 4,843,504, and claims a carriage positioning control concept whereby the magnetic mirror effect of a superconductive material relative to a magnetic field source operates to apply a force to a device on which the superconductor is attached. By placing the superconductor so that it will reflect at least one of the magnetic fields from two different sources, a force balance is obtained, and this force balance is used to position or move a carriage and its read/write head relative to a magnetic recording medium.

SUMMARY OF THE INVENTION

The present invention provides a superconductor/coil pair that is associated with a data transducing head and with a head support arm, so as to maintain the head at a controlled flying height above the recording surface of recording media, such as magnetic or optical disk means or tape means, the flying height magnitude being an inverse function of the magnitude of coil energization.

The invention provides recording head suspension apparatus utilizing a Meissner or magnetic mirror force to provide a controllable flying height between a transducer means and a recording means. An electrically energizable coil means, comprising a source of a variable magnitude magnetic field, and a superconducting material means are associated with the transducer means in a manner to provide a controllable repulsion force that is operable to force bias the transducer means toward the recording surface. The magnitude of this repulsion force is controlled to provide a controlled flying height for the transducer means, the flying height varying as an inverse function of the magnitude of coil energization, in opposition to a static spring force means that operates to force bias the transducer means away from the recording surface.

As a feature of the invention, coil energization is controlled to provide a relatively large flying height when the transducer is not operable to transduce the recording surface, and to provide a relatively small flying height when the transducer is operable to transduce the recording surface.

As a further feature of the invention, a height sensor means is provided to sense the flying height of the transducer means, and to control coil energization in a closed loop feedback sense.

In some cases, a recording device of the type in which the invention finds utility includes a number of closely spaced disks that are mounted to rotate on a common spindle (i.e. a stack of disks) at a substantially constant speed. A head access mechanism includes an access motor (i.e. a rotary or a linear actuator) that moves a comb-like set of arms between the disks. Each arm exclusive to the comb's two end arms) support a pair of transducing heads, one head adjacent to each of the two adjacent disk recording surfaces.

The present invention provides a superconductor/coil pair for each head of the disk stack. Each head is force biased toward its arm and away from its adjacent recording surface, by operation of a spring force means. The superconducting member and coil member of each superconductor/coil pair are mounted in confronting relation, such that electrical energization of the coil produces a magnetic mirror or Meissner force that operates in opposition to the spring force bias. Variable magnitude energization of the coil operates to produce a variable magnitude opposition force, so as support the head at a controlled distance from the recording surface. A distance sensor may be provided to control the magnitude of coil energization in a closed loop manner.

An object of the invention is to provide a method and an apparatus for establishing a controlled flying distance between data transducing head means and data disk means having a recording surface thereon, wherein the controlled flying distance is maintained by operation of a superconductor/coil pair.

In general, the invention provides elongated arm means supported at a fixed distance from a recording surface, this distance being greater than the desired flying distance. A transducing head means is mounted on the arm means, to thereby form a head/arm pair. The head means is force biased toward the arm means, so as to position the head means at a first distance from the recording surface, this first distance also being greater than the desired flying distance. A superconductor/coil pair cooperates with the head/arm pair. Electrically energization of the coil produces a magnetic mirror repulsion force between the head means and the arm means in opposition to the force bias. The magnitude of coil energization may be maintained in a closed loop manner, such as to achieve the desired flying distance between the head means and its adjacent recording surface.

As a feature of the invention, the head means and the data disk means are mounted in an evacuated housing having a near vacuum therein.

As a further feature of the invention, the disk drive of the invention is cooled to the superconductivity temperature of the superconductor/coil pair prior to utilizing the head means to transduce data. Thereafter the disk drive is radiantly maintaining at this low temperature as the head means is used to transduce data.

These and other objects and advantages of the invention will be apparent to those of skill in the art upon reference to the following detailed description of the invention, which description makes reference to the drawing.

DETAILED DESCRIPTION OF THE INVENTION

Figure 1:
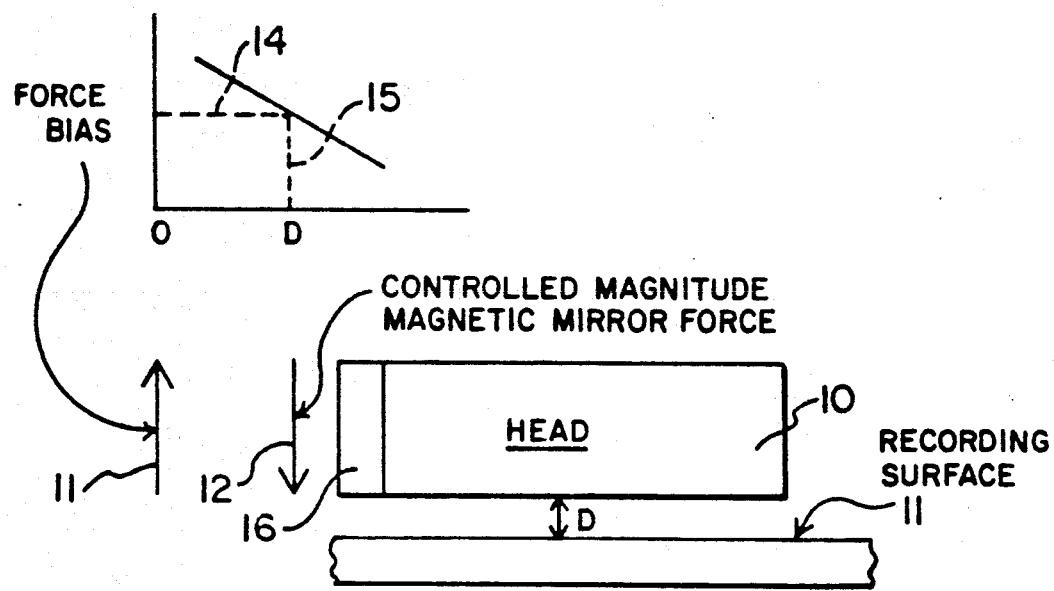
FIG. 1 shows the basic structure of the invention whereby the flying height D that exists between a transducing head and a closely adjacent recording surface is controlled by the force balance that exists between a spring-type force bias vector whose magnitude varies as an inverse function of the flying height D, and a controlled magnitude magnetic mirror force vector.

FIG. 1 shows a basic concept of the invention whereby the flying height D that exists between a transducing head 10 and a closely adjacent recording surface 11 is controlled by the force balance that exists between a spring-type force bias vector 11 whose magnitude varies as an inverse function of the flying height D, and a controlled magnitude magnetic mirror force vector 12.

The details of construction of head 10 and recording surface 11 are not critical to the invention. For example, the invention finds equal utility with longitudinal or vertical magnetic recording, or with optical recording. While the invention finds special utility when used with a disk or disk stack having concentric or spiral recording tracks, the invention can also be used where recording surface 11 is in the form of a moving tape having one or more longitudinal recording tracks.

The force-distance graph that is incorporated into FIG. 1 shows an idealized form of the force function 11 for an extension spring. As the spring is elongated or extended, and as the head's flying height D is accordingly reduced, the magnitude of force bias vector 11, operating on head 10 and extending away from recording surface 11, increases. In accordance with the invention, the interaction between a superconductor/coil pair (not shown in FIG. 1) produces a controlled magnitude repulsion force vector 12 that extends between the superconductor member and the coil member of the pair. This repulsion force 12 operates on head 10 and is directed toward recording surface 11. Thus, for example, a repulsion force 12 identified as magnitude 14 on the graph of FIG. 1 produces movement of head 11 until a force balance is achieved between it and a like magnitude force bias 11, also identified as 14 on the graph. As a result, a stable flying height D, identified as 15 on the graph, is achieved.

When the magnitude of coil energization increases, the magnitude of force vector 12 also increases, and flying height D reduces until the magnitude of vector 11 again equals that of vector 12. In this manner, and in accordance with the invention, controlling the magnitude of coil energization provides control of the head's flying height D.

As a feature of the invention, a height sensor 16 may be provided to sense the actual magnitude of flying height D, and to provide a feedback signal to maintain control of an input command flying height in a closed loop manner. Height sensor 16 may take a variety of forms. While inductive or capacitive sensors can be employed, a preferred sensor operates on the SQUID principle. Extremely sensitive magnetic field sensors or detectors known as SQUIDS (Superconducting QUantum Interference Device) are well known in the art. Josephson junction devices work as magnetic flux to voltage convertors. One type of SQUID comprises two Josephson junction devices in parallel. When sensor 16 is configured as a SQUID, recording surface 11 may include a magnetic track to which the SQUID is responsive. For example, a head following servo track would suffice, the stored magnetic data to which head 10 is responsive could also function as a height sensing data pattern, or a separate track dedicated only to the height sensing function could be used. A sensor 16 that physically contacts recording surface 11 with minimal friction can also be used. An example is a piezoelectric contact sensor.

Figure 2:
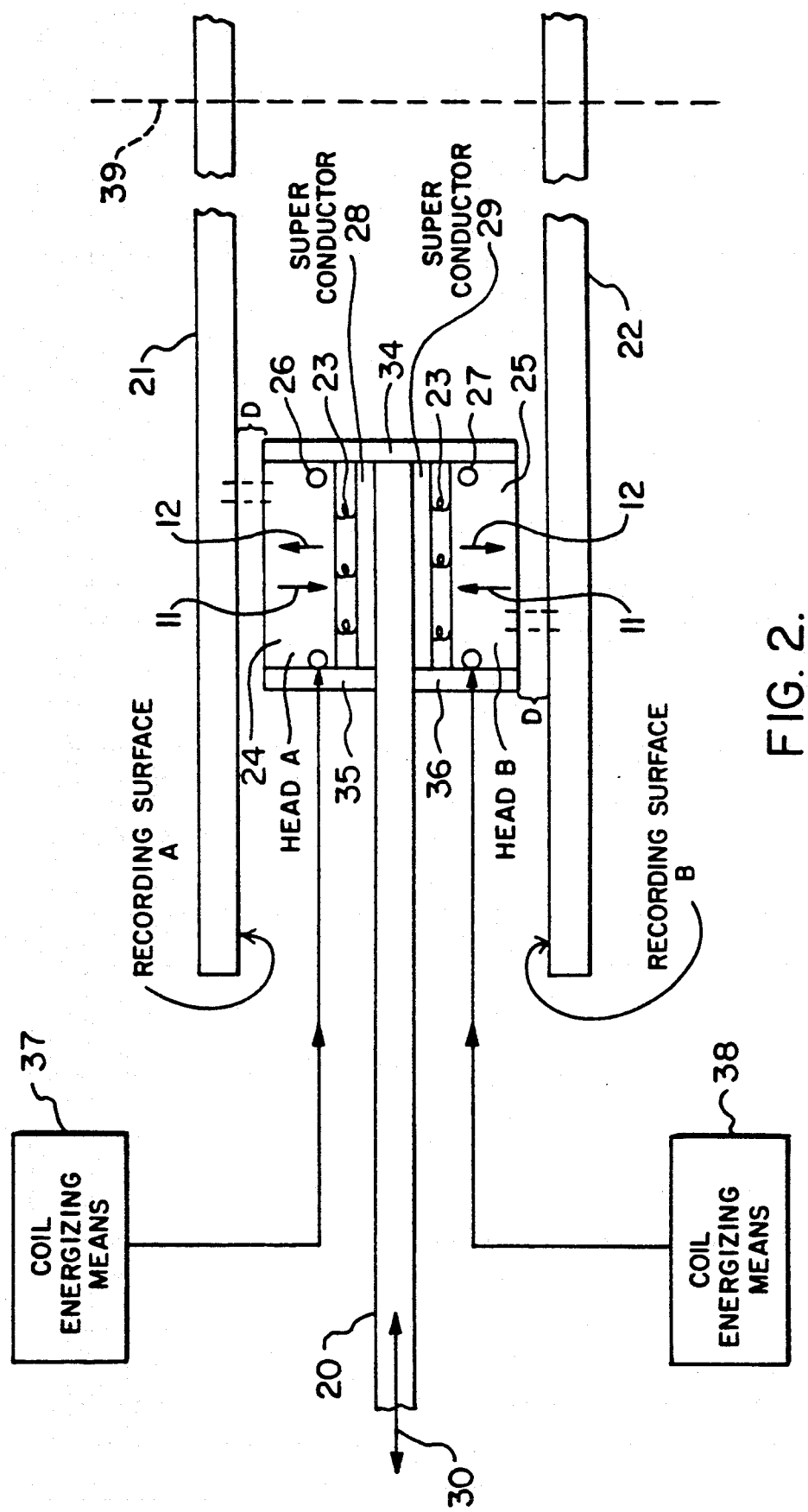
FIG. 2 shows an embodiment of the invention wherein a generally rigid access arm extends between two closely adjacent disks of a multi-disk stack, wherein the force bias of FIG. 1 is supplied by extension springs that mount a pair of heads to the access arm, and wherein the magnetic mirror force of FIG. 1 is provided by way of the variable energization of a pair of coils, and the magnetic mirror effect of the coils' magnetic fields upon a pair of superconductor elements.

In accordance with the invention shown in FIG. 2, a generally rigid access arm 20 extends between two closely adjacent recording disks 21-22 of a multi-disk stack. For example, disks 21-22 may be spaced about 1.0 cm apart. Force bias 11 of FIG. 1 is supplied by a number of extension springs 23 that movably mount a pair of heads 24-25 onto access arm 20. Magnetic mirror force 12 of FIG. 1 is provided by variable energization of a pair of coils 26-27, and the magnetic mirror effect that the coils' magnetic fields have upon a pair of superconductor elements 28-29.

In FIG. 2 the superconductor member of each superconductor/coil pair is mounted on arm 20, whereas the coil member of each pair moves as its head moves. This construction is not critical to the invention. For example, mounting of the pair members can be reversed from that shown in FIG. 2.

In addition, within the teachings of this invention, the superconductor member of the superconductor/coil pair may be located under the adjacent recording surface. In this case, a spring-type force vector, such as 11, would extend in the opposite direction (i.e. toward the head/disk interface), and coil energization would produce a force vector that extended away from the head/disk interface. Flying height D would then vary as a direct function of coil energization (i.e. the higher the coil energization, the larger the flying height D).

Dotted line 39 identifies the central axis of rotation of the disk stack. As shown in FIG. 2, head 24 is also identified as head A which is operable to transduce data or information relative to recording surface A of disk 21. Although not shown, the upper surface of disk 21 and the lower surface of disk 22 both include recording surfaces having like configured heads associated therewith. All of the arms 20 of the disk stack are connected to a head actuator carriage and motor (not shown), as is well known by those skilled in the art.

In this embodiment of the invention, a pair of coil energizing circuit means 37-38 are provided to energize coils 26-27 in an open loop fashion. The magnitude of coil energization can be programmed to provide a low level of coil energization when a head is not selected to transduce its recording surface, and to provide a higher level of coil energization when the head is selected. In this way, a larger flying height D of an exemplary 100 microns is maintained when the head is in a quiescent state, thus minimizing the likelihood of a head crash. When a head is selected, its coil energization is increased so as to produce an exemplary 0.2 micron flying height D. This coil programming can be achieved, for example, by the data processing system (not shown) for which the disk stack of FIG. 2 is used to store data.

Elements 34-36 of FIG. 2 represent guides that facilitate movement of the two heads 24-25 toward and away from the closely adjacent recording surface. This function is not critical to the invention, and can be implemented in a number of ways well known to those skilled in the art.

Arm 20 is capable of generally radial movement relative to disks 21-22, as is represented by arrow 30. As is known by those of skill in the art, movement 30 may be provided by a variety of actuator motors and associated control electronics, so as to position the transducing portion of heads 24-25 at a desired data track position on the recording surfaces of the disks. Since this well known head access structure is not critical to the invention, it is not shown herein.

Figure 3:
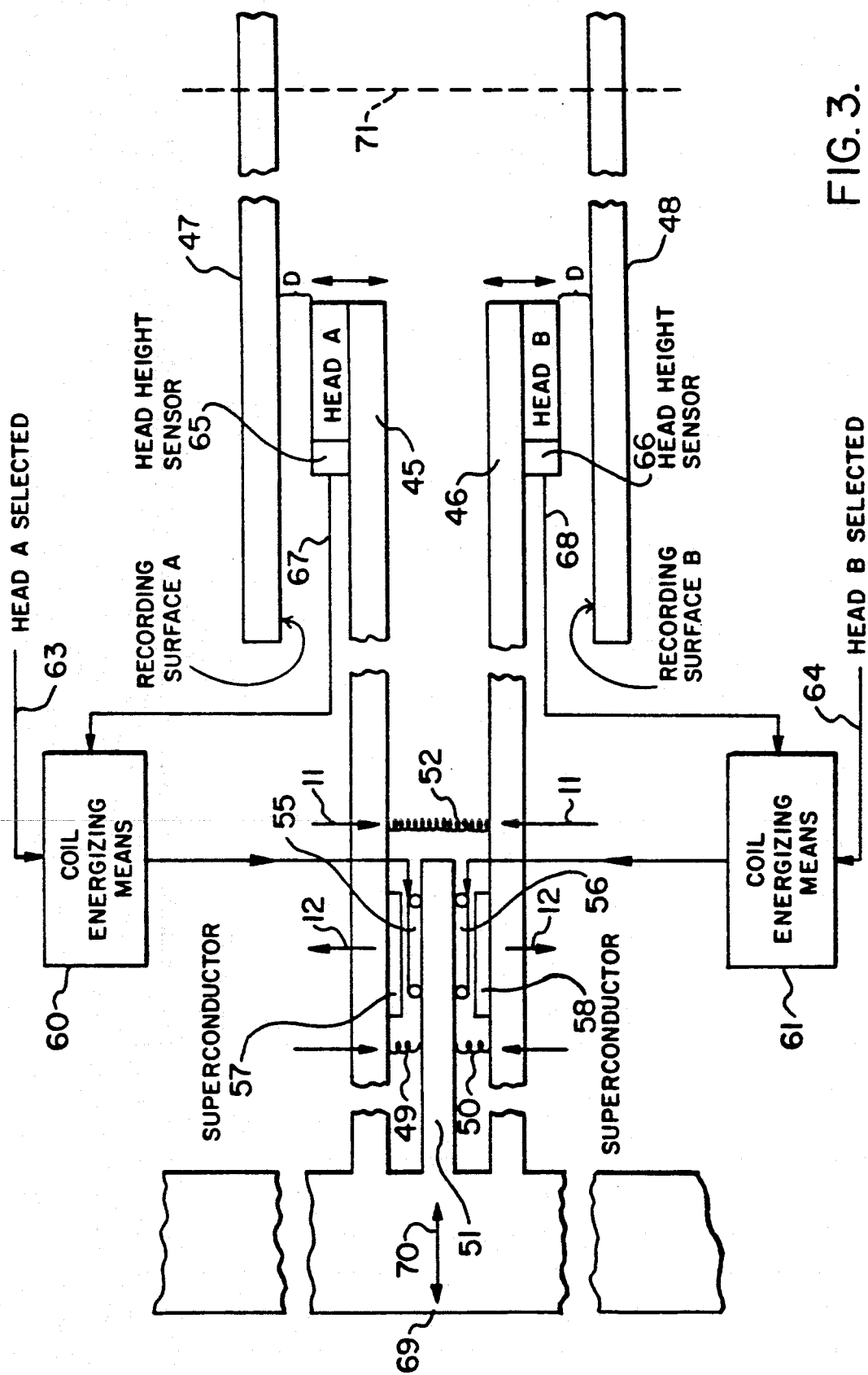
FIG. 3 shows an embodiment of the invention wherein a pair of vertically flexible blade-spring access arms extend between two closely adjacent disks of a multi-disk stack, wherein the force bias of FIG. 1 is supplied by flexure of the access arms and/or by extension springs that connect the spring arms to a rigid arm and/or by an extension spring that connects the spring arms to each other, and wherein the magnetic mirror force of FIG. 1 is provided by the variable energization of a pair of coils, and the magnetic mirror effect of the coils' magnetic fields upon a pair of superconductor elements, this figure also showing how the flying height is reduced when the head is selected for transducing use, and how the flying height is maintained in a closed loop manner by the use of a pair of flying height sensors.

FIG. 3 shows an embodiment of the invention wherein a pair of vertically flexible blade-spring access arms 45-46 extend between two closely adjacent disks 47-48 of a multi-disk stack that rotates at a substantially constant speed about spin axis 71. The force bias 11 that extends away from the head/disk interface is in this case supplied by flexure of blade-spring access arms 45-46, and/or by extension springs 49-50 that connect spring arms 45-46 to a generally rigid arm 51, and/or by extension spring 52 that interconnects spring arms 45-46.

Magnetic mirror forces 12 are provided by way of the variable energization of a pair of coils 55-56 and by the magnetic mirror effect that coil energization has upon a mating pair of superconductor elements 57-58.

In FIG. 3 pair of coil energizing circuit means 60-61 are provided to program the magnitude of coil energization, and thus the magnitude of force vectors 12. Input signal conductors 63-64 provide a command input to circuit means 60-61. This command input provide that a head's flying height D is reduced when the head is selected for transducing use, and that the head's flying height D is maintained at a larger flying height D when the head is not selected for transducing use.

A pair of head height sensors 65-66 are provided to continuously or periodically measure the actual flying height D, and to provide a feedback signal to circuit means 60-61 by way of conductors 67-68. In this way, the command flying height on conductors 63-64 is maintained in a closed loop, feedback manner, as is well known to those skilled in the art.

A carriage structure 69 is provided to support all of the spring blades 45-46 and arms 51 that are associated with the disk stack. This carriage is movable generally radially of the disk stack, as is represented by arrow 70. The details of this construction and arrangement are not critical to the invention and can take a variety of forms, as is well known to those skilled in the art.

Figure 4:
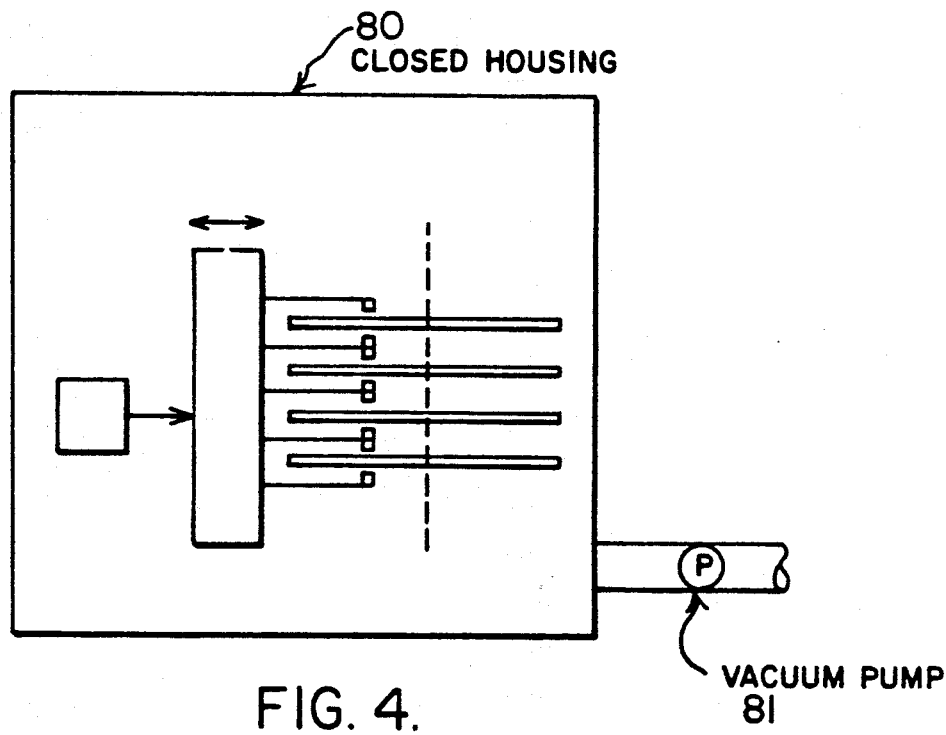
FIG. 4 shows a feature of the invention wherein the disk file apparatus of FIGS. 1-3 are mounted within an evacuated housing, such that flying height is maintained solely by virtue of the force balance that exists between the spring-type force bias and the controlled magnitude magnetic mirror force of FIGS. 1-3.

In accordance with a feature of the invention, the disk file apparatus of FIGS. 1-3 are mounted within an evacuated housing, such that flying height D is maintained solely by virtue of the force balance that exists between the spring-type force bias 11 extending away from the head/disk transducing interface, and the controlled magnitude magnetic mirror force 12 that operates to bias the head toward the head/disk interface. Such an arrangement is shown in FIG. 4.

In this figure, the housing is represented as a box-like enclosure 80 having a vacuum pump 81 that operates to maintain the interior of housing 80 at or near a total vacuum condition. As is schematically shown in FIG. 4, a disk drive constructed and arranged as above described is contained within housing 80.

In practice, it is desirable that the disk drive be cooled to the functioning temperature of the superconductor elements prior to evacuating housing 80, and prior to use of the disk drive therein for data processing purposes. Once the superconducting state has been reached, housing 80 is then evacuated by operation of pump 81, and thereafter the superconducting condition is maintained during data processing, for example by radiation cooling.

The invention has been described in detail while making reference to a number of embodiments thereof. Those skilled in the art will recognize yet other variations that are within the spirit and scope of the invention. For example, the electrically energizable coils of the above described superconductor/coil pairs may themselves be formed of superconductor material to good advantage, and the above described transducing heads may also make use of superconductor materials to good advantage. Thus, it is intended that this detailed description of the invention not be considered as a limitation on the spirit and scope of the invention.

What is claimed is:

1. Apparatus for exchanging information between moving recording media and an information transducing head, the head including structure for imparting information to the media, for detecting information recorded on the media, or both, comprising;

an arm having a head attached thereto, said head being capable of exchanging information with the media, a superconductor member associated with one of said arm or said head, an electrically energizable coil associated with said superconductor member and with the other one of said arm or said head, a controllable energizing circuit connected to energize said coil as a function of a desired distance to be maintained between said head and the media, a first force member biasing said head away from the media, said superconductor member and said coil providing a magnetic mirror force opposing said first force member, a distance sensor for sensing the distance that exists between said head and the media and providing a distance feedback input to said controllable energizing circuit, and distance command means providing a command input to said controllable energizing circuit to specify a command distance to be maintained between said head and the media, said distance command means providing a given magnitude of energization for said coil when said head is selected to either impart information to the media or detect information recorded on the media, said given magnitude of coil energization operating to reduce the distance between said head and the media when said head is so selected as compared to when said head is not so selected.

2. Apparatus for exchanging information between a data processing system and a stack of rotating recording disks, comprising;

a stack of recording disks having a plurality of spaced and concentrically located disks, each disk having two recording surfaces located on the two planar surfaces thereof, and each recording surface having a number of spaced recording tracks thereon, a transducing head for each of said recording surfaces, each head including structure for imparting information to the adjacent recording surface, for detecting information that is recorded on the adjacent recording surface, or both, a comb-like arm structure for moving a head to a media track of a recording surface and having a plurality of spaced arms, each arm being located to penetrate the space between two adjacent axially located disks of said disk stack, two heads attached to each of said arms, to thereby form two arm/head pairs for each arm, and to thereby position each head of each arm/head pair relative to an adjacent recording surface, a plurality of pairs of superconductor members and a like plurality of electrically energizable coils, one superconductor/coil pair being associated with each of said arm/head pairs, a plurality of controllable energizing circuits connected with one energizing circuit for each of said coils, to thereby energize each coil as a function of a desired distance to be maintained between a head and the adjacent recording surface a plurality of distance sensors for sensing the distance between each head and its adjacent recording surface and providing a distance feedback to its controllable energizing circuit, and distance command means providing a first command input to the controllable energizing circuit for a head to thereby reduce the distance between a head and its adjacent recording surface when the head is selected to either impart information to its adjacent recording surface or to detect information recorded on its adjacent recording surface, and providing a second command input to the controllable energizing circuit to thereby increase the distance between a head and its adjacent recording surface when the head is not so selected.

3. A method for exchanging information with moving recording media, comprising the steps of;

providing moving recording media having a number of physically spaced recording tracks thereon, providing an arm having an information transducing head attached thereto, said head being capable of exchanging information with said recording media, providing a superconductor member associated with one of said arm or said head, providing an electrically energizable coil associated with the other one of said arm or said head, such that energization of said coil generates a magnetic field interacting with said superconductor member to generate a repulsion force between said superconductor member and said coil, providing a force operable to bias said head and said superconductor member toward each other, providing a controllable energizing circuit connected to energize said coil as a function of a desired distance to be maintained between said head and said recording media, providing a sensor for sensing the distance that exists between said head and said recording media, providing a distance feedback input to said controllable energizing circuit in accordance with the magnitude of said sensed distance, providing a command distance input to said controllable energizing circuit to thereby specify a command distance to be maintained between said head and said recording media, and providing a decreased magnitude command distance input to said controllable energizing circuit when said head is selected to either impart information to said recording media or to detect information recorded on said recording media.

4. A method providing for the exchanging of information with a stack of rotating information recording disks, comprising the steps of;

providing a stack of recording disks having a plurality of spaced and concentrically located disks, each disk having a recording surface located on the two planar surfaces thereof, and each recording surface having a number of spaced recording tracks thereon, providing a transducing head for each of said recording surfaces, each head including structure for transducing information relative to an adjacent recording surface, providing a comb-like arm structure having a plurality of spaced arms, each arm being located to penetrate the space between two adjacent axially located disks of said disk stack, providing two heads attached to each arm of said comb-like structure, to thereby form two arm/head pairs for each arm, and to thereby position each head of said arm/head pair relative to an adjacent recording surface, providing a drive member connected to said comblike arm structure for moving a specified head to a specified track of a specified recording surface, providing a plurality of pairs of superconductor members and electrically energizable coils, one superconductor/coil pair being associated with each of said arm/head pairs, ar. ' providing a magnitude of energization for a coil when its head is selected to transduce information relative to its adjacent recording surface to reduce the distance between the selected head and its adjacent recording surface when the head is so selected as compared to when said head is not so selected.

5. The method of claim 4 including the steps of:

providing a plurality of controllable energizing circuits, one circuit for each coil, providing a plurality of distance sensors, one sensor for each head, for sensing the distance between each head and its adjacent recording surface, and providing a distance feedback input to each of said controllable energizing circuits in accordance with said sensed distance.

6. Recording head suspension apparatus utilizing a Meissner or magnetic mirror force to provide a controllable flying height between a transducer and a recording surface, comprising:

a transducer, recording media having a recording surface associated in transducing relation with said transducer, an electrically energizable coil associated with said transducer comprising a source of a variable magnitude magnetic field, superconducting material associated with said transducer in a manner to interact with the magnetic field produced by energization of said coil to provide a repulsion force operable to force bias said transducer toward said recording surface, a force member associated with said transducer to force bias said transducer away from said recording surface in opposition to said repulsion force, a controllable energizing circuit connected to said coil for energizing said coil in a manner to provide a controlled flying height between said transducer and said recording surface, said flying height varying as a function of the magnitude of coil energization, and control means for controlling said energizing circuit in a first manner to provide a relatively large flying height when said transducer is not operable to transduce said recording surface, and to control said energizing circuit in a second manner to provide a relatively small flying height when said transducer is operable to transduce said recording surface.

7. The apparatus of claim 6 wherein said force member provides a force whose magnitude increases as said flying height decreases.

8. The apparatus of claim 7 including;

a height sensor associated with said transducer and operable to sense the flying height of said transducer, and a feedback circuit connection said height sensor to said energizing circuit.

9. The apparatus of claim 8 wherein said transducer and said recording media operate in a substantial vacuum environment.

10. In combination, two closely adjacent data recording disks, a rigid access arm extending between said disks, a pair of data transducing heads, each head of said pair being mounted on opposite sides of said access arm so as to be located in spaced transducing relation to respective ones of said two recording disks, a spring force biasing each of said heads toward said arm and away from its recording disk, the magnitude of said spring force bias increasing as the space between a head and its recording disk decreases, a pair of magnetic mirror force members, each of which comprises a superconductor and an electrically energizable source of a variable magnitude magnetic field, each of said magnetic mirror force members being associated with one of said heads so as to magnetic mirror force bias each of said heads away from said arm and toward its recording disk, the magnitude of said magnetic mirror force bias increasing as the magnitude of said magnetic field increases, circuit means for electrically energizing said source of variable magnetic field so as to achieve a desired space between a head and its recording disk, and control means connected to said circuit means to selectively reduce the transducing space between a head and its recording disk by increasing the magnitude of said magnetic field when the head is to be located in spaced transducing relation to its recording disk.

11. In combination,
two adjacent data recording disks,
a pair of flexible blade-spring access arms extending between said disks so as to place each of said access arms adjacent to a different one of said disks,
a pair of data transducing heads, each head being mounted on one of said access arms so as to be located in spaced transducing relation to a different one of said recording disks,
said access arms providing a spring force biasing each of said heads away from its recording disk, and the magnitude of said spring force bias increasing as the space between a head and its recording disk decreases,
a pair of magnetic mirror force members, each of which comprises a superconductor and an electrically energizable source of a variable magnitude magnetic field, each of said magnetic mirror force members being associated with one of said heads so as to magnetic mirror force bias each of said heads toward its recording disk, the magnitude of said magnetic mirror force bias increasing as the magnitude of said magnetic field increases,
circuit means for electrically energizing said sources of variable magnetic field so as to achieve a desired space between a head and its recording disk, and
control means connected to said circuit means to selectively increase the magnitude of said magnetic field to thereby reduce the distance between a head and a disk when a head is to be located in transducing relation to a recording disk.

* * * * *